(12) United States Patent
Lei

(10) Patent No.: US 10,818,176 B2
(45) Date of Patent: Oct. 27, 2020

(54) SYSTEM AND METHOD FOR PSEUDO NAVIGATION ASSISTANCE IN A VEHICLE

(71) Applicant: Ford Global Technologies, LLC, Dearborn, MI (US)

(72) Inventor: Oliver Lei, Windsor (CA)

(73) Assignee: Ford Global Technologies, LLC, Dearborn, MI (US)

(*) Notice: Subject to any disclaimer, the term of this patent is extended or adjusted under 35 U.S.C. 154(b) by 374 days.

(21) Appl. No.: 15/754,963

(22) PCT Filed: Oct. 16, 2015

(86) PCT No.: PCT/US2015/056033
§ 371 (c)(1),
(2) Date: Feb. 23, 2018

(87) PCT Pub. No.: WO2017/065806
PCT Pub. Date: Apr. 20, 2017

(65) Prior Publication Data
US 2020/0234586 A1  Jul. 23, 2020

(51) Int. Cl.
*G08G 1/0968* (2006.01)
*H04W 4/46* (2018.01)
*G01C 21/36* (2006.01)

(52) U.S. Cl.
CPC ... *G08G 1/096822* (2013.01); *G01C 21/3629* (2013.01); *G01C 21/3655* (2013.01); *H04W 4/46* (2018.02)

(58) Field of Classification Search
CPC ....... G08G 1/096822; G08G 1/096811; G08G 1/0965; G08G 1/0962; G08G 1/0968;
(Continued)

(56) References Cited

U.S. PATENT DOCUMENTS 7,493,208 B1  2/2009 Craine
8,279,083 B2  10/2012 Tengler et al.
(Continued)

FOREIGN PATENT DOCUMENTS

JP   2003308370 A   10/2003
JP   2004085405 A    3/2004
KR  1020020080882 A  10/2002

OTHER PUBLICATIONS

International Search Report and the Written Opinion for PCT Application No. PCT/US2015/056033 dated Jan. 19, 2016.

*Primary Examiner* — Marthe Y Marc-Coleman
(74) *Attorney, Agent, or Firm* — Brandon Hicks; Eversheds Sutherland (US) LLP

(57) ABSTRACT

Embodiments provide a vehicle comprising a wireless transceiver for communicating with a second vehicle, a processor configured to send, to the second vehicle, a request for route guidance to a destination and receive, from the second vehicle, a series of navigational directions to the destination, and a user interface for presenting the series of navigational directions as at least one of audio messages and textual messages. Embodiments also includes a wireless communication system comprising a wireless unit included in a first vehicle and configured to transmit, to a second vehicle, a request for route guidance to a destination, and a telematics unit included in the second vehicle and configured to transmit, to the first vehicle, a series of navigational directions to the destination, the directions including one or more of maneuvers, street names, and driving distances.

19 Claims, 4 Drawing Sheets

(58) Field of Classification Search
CPC . H04W 4/46; G01C 21/3655; G01C 21/3629; G01C 21/3626; G01C 21/3691; G01C 21/34; G05D 3/12
See application file for complete search history.

(56) References Cited

U.S. PATENT DOCUMENTS

| | | |
|---|---|---|
| 8,909,466 B2 | 12/2014 | Rogers et al. |
| 2002/0154605 A1 | 10/2002 | Preston et al. |
| 2002/0198653 A1 | 12/2002 | Lutter |
| 2003/0146850 A1* | 8/2003 | Fallenstein .............. G08G 1/09 340/901 |
| 2004/0073361 A1 | 4/2004 | Tzamaloukas et al. |
| 2004/0158401 A1 | 8/2004 | Yoon |
| 2004/0174977 A1* | 9/2004 | Kanemitsu ............. G08G 1/161 379/219 |
| 2005/0221579 A1* | 10/2005 | Matsumoto ....... H01L 21/76232 438/424 |
| 2007/0198182 A1 | 8/2007 | Singh |
| 2008/0065311 A1 | 3/2008 | Bauchot et al. |
| 2008/0186206 A1* | 8/2008 | Reumerman ........... H04L 12/18 340/902 |
| 2016/0091328 A1* | 3/2016 | Ould-Ahmen-Vall ...................... G08G 1/0112 701/117 |
| 2016/0205238 A1* | 7/2016 | Abramson ......... G01C 21/3641 455/456.4 |

\* cited by examiner

SYSTEM AND METHOD FOR PSEUDO NAVIGATION ASSISTANCE IN A VEHICLE

CROSS-REFERENCE TO RELATED APPLICATIONS

This is the National Stage Application of International Application No. PCT/US2015/056033, filed on Oct. 16, 2015 and titled "System and Method for Pseudo-Navigation Assistance in a Vehicle," which is incorporated by reference in its entirety.

TECHNICAL FIELD

This application generally relates to vehicles without navigation capability and more specifically, to providing route guidance to vehicles with no navigation capability.

BACKGROUND

Many vehicles include on-board navigation systems that are integrated into a computing system of the vehicle and communicatively coupled to a location-determining receiver (e.g., Global Positioning System (GPS) receiver) included in the vehicle. Such on-board navigation systems are designed to use GPS data to determine a current vehicle location, generate route guidance information for a destination, and display the current location, route guidance information, and associated map data on a display screen of the vehicle.

For vehicles that do not include built-in or on-board navigation capability, navigation functions can still be obtained while operating the vehicle by using personal navigation devices (e.g., dedicated GPS devices manufactured by TomTom, Garmin, Magellan, etc.) that are, for example, added to the vehicle after-market, or by using personal mobile devices equipped with navigation capability (e.g., a GPS-enabled smartphone with a mapping application). Typically, such devices include a location-determining receiver for obtaining GPS data and a display screen for displaying route guidance information and map data.

However, some vehicles have no navigation capability, on-board, built-in, add-on, handheld, or otherwise. In such cases, the vehicle operator cannot obtain navigation help while traveling on the road, for example, once plans change mid-route, the driver has lost his/her way, or road closures force the vehicle into an alternate route. Accordingly, there is still a need in the art for a vehicle system that can provide navigation guidance to vehicles without navigation capability.

SUMMARY

The invention is intended to solve the above-noted and other problems by providing systems and methods designed to provide pseudo-navigation assistance to vehicles with no navigation capability through the use of wireless communication between vehicles on the road.

For example, one embodiment provides a vehicle comprising a wireless transceiver for communicating with a second vehicle; a processor configured to send, to the second vehicle, a request for route guidance to a destination and receive, from the second vehicle, a series of navigational directions to the destination; and a user interface for presenting the series of navigational directions as at least one of audio messages and textual messages.

As another example, one embodiment provides a method for providing pseudo-navigation assistance in a vehicle. The method comprises transmitting, to a second vehicle, a request for route guidance to a destination; receiving, from the second vehicle, a series of navigational directions to the destination; and presenting, via a user interface, the series of navigational directions as at least one of audio messages and textual messages.

As another example, one embodiment provides a wireless communication system comprising a wireless unit included in a first vehicle and configured to transmit, to a second vehicle, a request for route guidance to a destination; and a telematics unit included in the second vehicle and configured to transmit, to the first vehicle, a series of navigational directions to the destination, the directions including one or more of maneuvers, street names, and driving distances.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
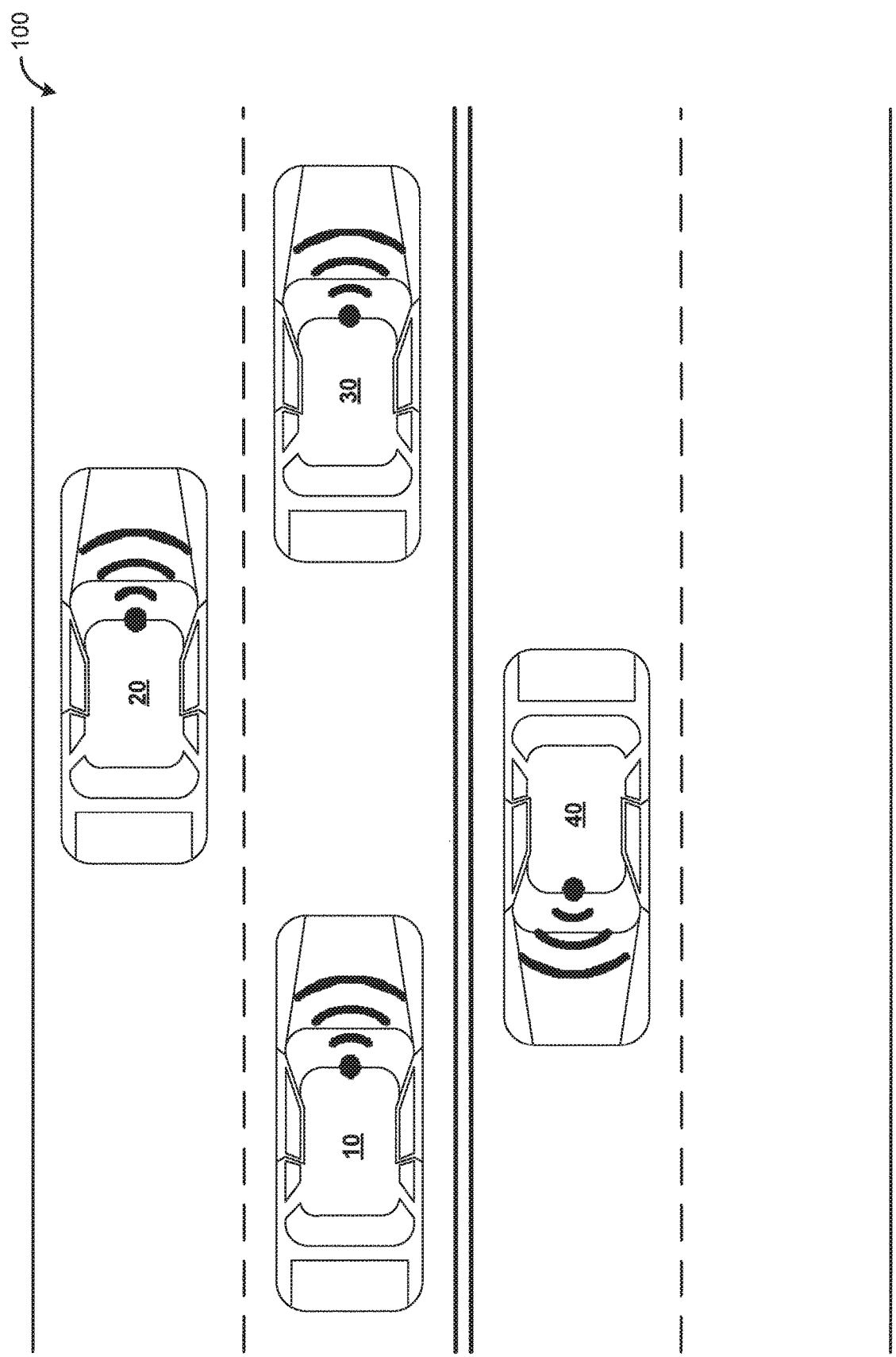
FIG. 1 is an illustration of an example environment for providing pseudo-navigation assistance in a vehicle, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

As used herein, the term "pseudo-navigation" refers to static, or non-dynamic, guidance that is provided to a vehicle without an on-board navigation system, or other navigational capability, by one or more other vehicles with on-board navigational capability, in accordance with embodiments. That is, instead of map images, map data, or other dynamic route guidance that is typically provided by an on-board navigation system, the pseudo-navigation assistance comprises step-by-step navigational directions, or static commands, for guiding a driver of the non-navigation-capable vehicle from a starting location to an intended destination. Based on the static directions, the driver can navigate towards the destination manually, for example, by watching for street names and other roadside indicators provided in the navigational directions.

In embodiments, the pseudo-navigation assistance includes directions to perform certain driving maneuvers, such as turn (e.g., turn left, turn right, take a U-turn, etc.), merge (e.g., merge left, merge right, etc.), veer (e.g., veer left, veer right, etc.), stay (e.g., stay in current lane), follow (e.g., follow signs to an upcoming highway), continue (e.g., continue straight, continue onto an upcoming road, etc.), head (e.g., head south, head north, etc.), use (e.g., use left lane, use any lane, etc.), take (e.g., take an upcoming exit, take a sharp right), etc.), stop or pull over, etc. The pseudo-navigation assistance can also include street names, highway or route numbers, roadside descriptors (e.g., first cross street, third stop sign, etc.), house or building numbers, and other information to indicate where or when to perform the maneuver (e.g., turn left at Oak Street, merge onto Canal Street, turn right at the first traffic light, etc.). In some cases, the pseudo-navigation assistance can further include driving distances or times associated with performance of the maneuvers, or to indicate a distance, or time, until performance of the next maneuver or direction (e.g., continue on Canal Street for 2 miles, turn left in 300 feet, etc.). The pseudo-navigation assistance may also include information about or describing the destination (e.g., the destination will be on the left, the destination will be 20 feet ahead of the stop sign, etc.) and/or the starting location (e.g., route guidance begins at the intersection of Devon Avenue and Golf Road, route guidance begins at 2438 Sixth Street, etc.).

FIG. 1 illustrates an example environment 100 for providing pseudo-navigation assistance to a non-navigation-capable vehicle 10 using wireless communications with one or more of a plurality of navigation-capable vehicles 20, 30, and 40 traveling on the same road as the vehicle 10, in accordance with embodiments. While the illustrated environment 100 shows four vehicles on a two-way, four-lane road, it should be appreciated that the environment 100 can include more or fewer vehicles and may be implemented on any type of road, including, for example, two-lane roads, one-way roads, and divided highways. In some cases, the environment 100 may further include one or more roadside units (not shown), such as, for example, a node, computing device, or communication tower, for facilitating wireless communication between the vehicles 10, 20, 30 and 40 and/or for communicatively connecting one or more of the vehicles 10, 20, 30, and 40 to a remote server.

The vehicles 10, 20, 30, and 40 can use any type of wireless communication system to communicate with each other and/or with roadside units or other external entities, including, for example, digital cellular systems, Bluetooth systems, wireless LAN systems, infrared systems, radio frequency identification (RFID), near field communication (NFC), etc. In a preferred embodiment, each of the vehicles 10, 20, 30, and 40 is configured to wirelessly communicate with each other using dedicated short range communication (DSRC) technology, or any other wireless technology that can provide very high data transmission, low latency, and reliable performance in high vehicle speeds and extreme weather conditions.

As will be appreciated, dedicated short range communications (DSRC) is a two-way, short-range or medium-range wireless communications technology that is designed for automotive use to exchange a wide range of information in both vehicle-to-vehicle (V2V) applications and vehicle-to-infrastructure (V2I) applications. The DSRC technology has been proposed for use in a number of automotive or roadside applications, including, for example, accident reports, approaching emergency vehicle warnings, sudden braking ahead warnings, and electronic parking and toll payments. As will be appreciated, the DSRC technology permits secure, reliable communications directly between vehicles or between vehicles and roadside units (e.g., over a dedicated communications channel) and can be used to conduct point-to-point wireless communications (e.g., wireless messages directed at a specific vehicle or roadside unit), as well as to broadcast wireless messages to all vehicles and roadside units within a limited broadcast area. In the United States, DSRC is allocated for high frequency radio transmission, for example, in a dedicated 75 MHz spectrum band around 5.9 GHz.

In the environment 100, the vehicle 10 can be capable of communicating with any one of the vehicles 20, 30, and 40 to obtain pseudo-navigation assistance. In some cases, the vehicle 10 generally broadcasts a request for route guidance, and the request is received by any vehicle within a broadcast range (or predetermined proximity) of the vehicle 10 (e.g., 100 to 1000 meters), such as, e.g., the neighboring vehicles 20, 30, and 40. If more than one vehicle responds to the request, the vehicle 10 may apply one or more selection rules to determine which route guidance to use or which nearby vehicle takes precedence over the others (e.g., use the first-received response, give preference to vehicles traveling in the same direction, give preference to the nearest vehicle, etc.). In other cases, the vehicle 10 first pings the vehicles 20, 30, and 40, and any other vehicle within the broadcast range, to determine which nearby vehicles are able and willing to share navigational information or otherwise provide pseudo-navigation assistance. If two or more vehicles return a positive response, the vehicle 10 may apply the one or more selection rules to select a vehicle from the two or more responding vehicles. The vehicle 10 can then use point-to-point communication to transmit the request for route guidance to the selected vehicle. In some cases, the vehicle 10 may rank the nearby vehicles based on the one or more selection rules and send a request for route guidance to each vehicle one the list, one by one, until a positive response (e.g., in the form of pseudo-navigation assistance) is sent back to the vehicle 10.

In one embodiment, the selection rules include giving first preference to a vehicle traveling in the same direction as the requesting vehicle (e.g., the vehicle 10), and then giving preference to the vehicle that is in closest proximity to the requesting vehicle. Applying these rules to the environment 100, while the vehicle 40 is the closest in proximity to the vehicle 10, it is traveling in an opposite direction and therefore, will not be selected, or will be ranked lower than the other neighboring vehicles 20 and 30. Of the two vehicles 20 and 30 that are traveling in the same direction as vehicle 10, the vehicle 20 is nearest to the vehicle 10. Thus, the vehicle 10 may send a request for route guidance to the vehicle 20 first. If the vehicle 20 is not able to fulfill the request (e.g., due to a malfunction with its navigation device or a faulty GPS connection), the vehicle 10 may continue down a ranked list of nearby vehicles and then send the request to, for example, the vehicle 30. It will be appreciated that other techniques may be used by the vehicle 10 to select one of a plurality of neighboring or nearby vehicles for obtaining pseudo-navigation assistance, as disclosed herein.

Figure 2:
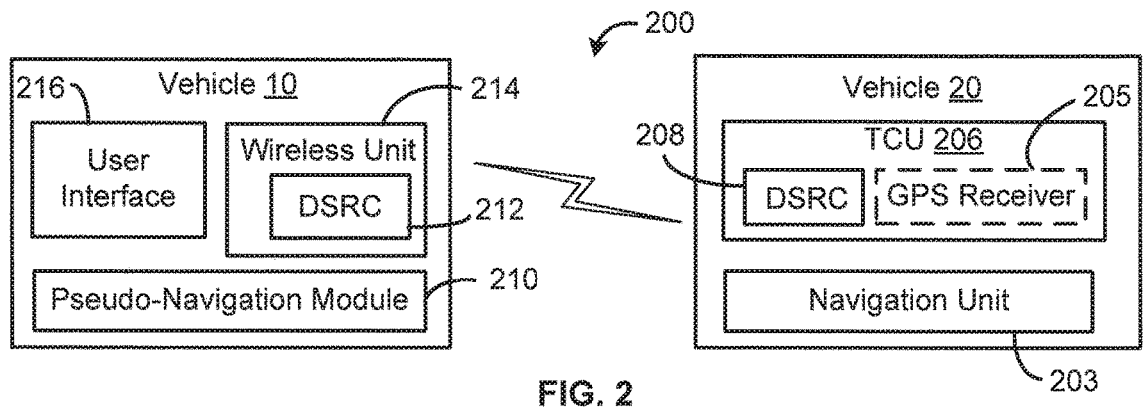
FIG. 2 is a block diagram of an example wireless communication system for providing pseudo-navigation assistance in a vehicle, in accordance with certain embodiments.

Referring additionally to FIG. 2, shown is an example wireless communication system 200 for providing pseudo-navigation assistance to the non-navigation-capable vehicle 10 using the navigation capability of the neighboring vehicle 20 in the environment 100, in accordance with embodiments. As shown, the neighboring vehicle 20 has navigation capability provided by a navigation unit 202. In embodiments, the navigation unit 202 can be configured (e.g., using a program module or software instructions) to receive, from the vehicle 10, a request for pseudo-navigation assistance, or route guidance, to an indicated destination; in response thereto, calculate a route from a starting location to the destination; generate a series of static navigational directions for guiding the vehicle operator along the route; and send the series of navigational directions to the vehicle 10.

In some cases, the navigation unit 203 is an on-board navigation system that is integrated into a vehicle computing system (not shown) of the vehicle 20 and communicatively coupled to a GPS receiver 205 or other location-determining receiver included in a telematics control unit (TCU) 206 of the vehicle 20. In such cases, the navigation unit 203 is also coupled to a display screen (not shown) of the vehicle 20 for displaying route information and map data to a vehicle operator. The TCU 206 also includes a DSRC transceiver 208 for facilitating wireless communication with the vehicle 10 and/or any other nearby vehicles. In other cases, the navigation unit 203 is a stand-alone or add-on navigation device that includes the GPS receiver 205 and may be communicatively coupled to the vehicle computing system of the vehicle 20, for example, in order to have access to the DSRC transceiver 208 included in the TCU 206. It will be appreciated that the other navigation-capable vehicles 30 and 40 in the environment 100 may be similar to the vehicle 20 at least by including the same components shown in FIG. 2.

By contrast, the vehicle 10 has no navigation unit, GPS receiver, or other navigation capability, as shown in FIG. 2. According to embodiments, the non-navigation-capable vehicle 10 includes a pseudo-navigation module 210 that comprises a program module or software instructions for, or is otherwise capable of, generating a request for route guidance from a current vehicle location to an indicated destination, sending the route guidance request to the vehicle 20, and in response to the request, receiving the series of navigational directions to the indicated destination from the vehicle 20. The vehicle 10 also comprises a DSRC transceiver 212 included in a wireless unit 214 of the vehicle 10 for facilitating wireless communication with the vehicle 20 and/or any other nearby vehicles.

The vehicle 10 further includes a user interface 216 (e.g., a display, an audio speaker, etc.) for presenting the series of navigational directions received from the vehicle 20 to a vehicle operator as at least one of audio (or audible) messages and textual (or written) messages. For example, the user interface 216 may include one or more input devices associated with an audio system of the vehicle 10 and one or more audio speakers coupled to the audio system, and the pseudo-navigation module 210 may be configured to convert the series of navigational directions into audio messages or files and provide the audio files to the vehicle audio system for playback through the one or more audio speakers, in accordance with user inputs received via the input devices. As another example, the user interface 216 may include a display screen and one or more input devices associated with an audio system or an infotainment system of the vehicle 10, and the pseudo-navigation module 210 may be configured to convert the series of navigational directions into text messages or files and provide the text files to the display screen for presentation thereon, in accordance with user inputs received via the input devices. In some cases, the display screen of the user interface 216 may be included in an electronic instrument cluster or digital dash of the vehicle 10.

Regardless of whether the directions are presented as audio or text messages, the user interface 216 can be configured to individually present (e.g., play or display) each navigational direction in the series one at a time (e.g., present a first direction, then a second direction in place of the first direction, etc.). Further, the user interface 216 can include one or more input devices that are configured to enable user control of the presentation of the navigational directions. For example, the user interface may present a next direction in the series of directions upon receiving a user input to move forward (e.g., selection of a next or fast forward button). Also, the user interface may present a previous direction, or move backwards, in the series of directions upon receiving a user input to go back (e.g., selection of a back or rewind button). In some cases, the user interface may repeat presentation of a currently-selected navigational direction upon receiving a user input to repeat or re-play (e.g., selection of a play button).

Figure 3:
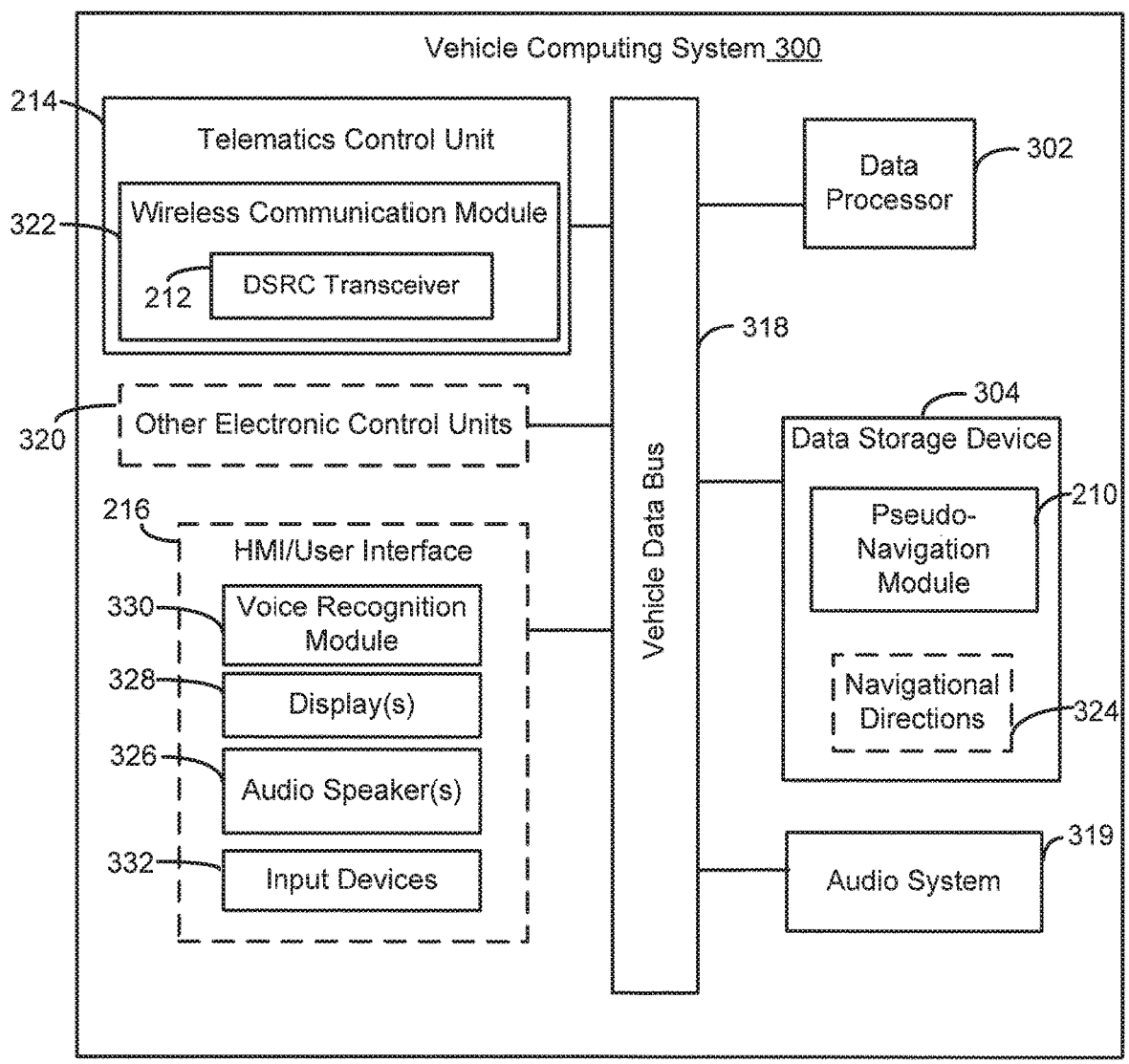
FIG. 3 is a block diagram of an example vehicle computing system configured for providing pseudo-navigation assistance, in accordance with certain embodiments.

Referring now to FIG. 3, shown is an example vehicle computing system (VCS) 300 that may be included in the vehicle 10, for example, as part of a vehicle electronics system or an infotainment system of the vehicle 10. The VCS 300 comprises the user interface 216, the wireless unit 214, and the pseudo-navigation module 210 shown in FIG. 2, as well as data processor 302 (e.g., an electronic data processor), data storage device 304, a vehicle data bus 318, a vehicle audio system 319, and one or more other electronic control units (ECUs) 320. In some cases, each of the vehicles 20, 30, and 40 can include a vehicle computing system that is substantially similar to the VCS 300, in that the vehicles 20, 30, and 40 include at least the same components as shown in FIG. 3, but differs from the VCS 300 in that each of the vehicles 20, 30, and 40 also includes a GPS receiver and a navigation unit, for example, as shown in FIG. 2.

The vehicle data bus 318 (such as, e.g., a controller area network (CAN) bus) passes data to and from the various ECUs 320, the vehicle audio system 319, the wireless unit 214, the user interface 216, and other vehicle and/or auxiliary components in communication with the VCS 300. Further, the data processor 302 can communicate with any one of the data storage device 304, the wireless unit 214, the user interface 216, the audio system 319, and the other ECUs via the data bus 318 in order to carry out one or more functions, including the functions associated with the pseudo-navigation module 210. The data processor 302 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 300 can comprise a general purpose computer that is programmed with various programming instructions or modules stored in the data storage device 304 (e.g., electronic memory), or elsewhere.

The wireless unit 214 can be an ECU for enabling the vehicle 10 to connect to one or more wireless networks, such as, for example, WiFi, cellular, Bluetooth, NFC, RFID, satellite, DSRC, and infrared. In some cases, the wireless unit 214 may be a vehicle telematics unit of the vehicle 10. In embodiments, the wireless unit 214 includes a wireless communication module 322 comprising one or more antennas, radios, modems, receivers, and/or transmitters (not shown) for connecting to, or interfacing with, the various wireless networks. In particular, the wireless communication module 322 includes the DSRC transceiver 212 for wirelessly communicating with other vehicles over the DSRC network. In embodiments, the wireless communication module 322 can also include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. In accordance with embodiments, while the TCU 206 in the vehicle 20 includes a GPS receiver 205 that is configured to control tracking of the vehicle 20 using latitude and longitude values obtained from a GPS satellite, the wireless unit 214 of the vehicle 10 does not include a location-determining receiver or other navigation capability.

In embodiments, the wireless unit 214 receives external data, including navigational directions 324 from the vehicle 20, via the wireless communication module 322 and/or the DSRC transceiver 212, and provides the external data to the data processor 302, the user interface 216, the audio system 319, or an appropriate one of the other ECUs 320 of the VCS 300. In one embodiment, when the wireless unit 214 receives a series of navigational directions from another vehicle, such as the neighboring vehicle 20, the wireless unit 214 sends the navigational directions to the data processor 302, via the vehicle data bus 318, for processing in accordance with the pseudo-navigation module 210.

The one or more other ECUs 320 can be responsible for monitoring and controlling the electrical systems or subsystems of the vehicle 10. Each ECU may include, for example, one or more inputs and outputs for gathering, receiving, and/or transmitting data, a memory for storing the data, and a processor for processing the data and/or generating new information based thereon. As an example, the one or more ECUs 320 can include a body control module (BCM), a powertrain control module (PCM), a brake control module, a door control unit, etc.

The data storage device 304 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. In some cases, the data storage device 304 stores navigational directions 324 received from the vehicle 20 in response to a request for route guidance. The data storage device 304 may temporarily store the navigational directions 324, for example, until the vehicle 10 reaches the indicated destination. In other cases, the data storage device 304 may store the navigational directions 324 for a longer term, for example, to allow future retrieval of the directions 324 for the next time the vehicle operator wishes to travel to the same destination.

The data storage device 304 also stores one or more software program modules or software instructions, including the pseudo-navigation module 210, for execution by the data processor 302. According to embodiments, the pseudo-navigation module 210 is configured, or adapted, to generate a request for route guidance to an indicated destination, send the route guidance request to the wireless unit 214 for transmission to the vehicle 20 via the DSRC transceiver 322, receive navigational directions 324 to the indicated destination from the vehicle 20 via the DSRC transceiver 322, save the navigational directions 324 in the data storage device 304 or other memory of the vehicle 10, and provide the navigational directions 324 to the user interface 216 for presentation to the vehicle operator as audio and/or text messages.

In embodiments, the vehicle audio system 319 includes an AM/FM radio receiver or tuner, an amplifier for driving an audio signal to one or more audio speakers 326 or other audio output devices, and one or more media devices (e.g., tape player, CD player, DVD player, satellite radio, auxiliary devices, etc.). In some embodiments, the vehicle audio system 319 forms part of a pre-installed infotainment system or other original equipment manufacturer (OEM) system of the vehicle 10. In other embodiments, the vehicle audio system 319 comprises a head unit that is installed in the vehicle 10 after-market, for example, by coupling the head unit to the audio speakers 326 and other OEM components of the vehicle computing system 300.

According to embodiments, the user interface 216 (also known as a human-machine interface (HMI)) can comprise the audio speaker(s) 326, one or more displays or display screens 328, an in-vehicle voice or speech recognition module 330, a plurality of input devices 332, and various other devices for inputting, entering, receiving, capturing, displaying, or outputting data associated with the vehicle computing system 300, the pseudo-navigation module 210, or the techniques disclosed herein. According to embodiments, the input devices 332 can include, for example, one or more of a keyboard, keypad, pointing device (e.g., electronic or optical mouse), button or push button, slider, switch, knob, dial, touch input device, microphone, and any other type of input device. The user interface 216 can be configured to interact with the other ECUs 320, the audio system 319, and/or the data processor 302 via the data bus 318 in order to provide information or inputs received via the user interface 216 to an appropriate component of the VCS 300 and to present, to the vehicle operator, information or outputs received from the various components of the VCS 300.

In some cases, one or more components of the user interface 216 can be included in, or associated with, one or more of the vehicle audio system 319, the other ECUs 320, or other units of the VCS 300. For example, at least one of the displays 328 and one or more of the input devices 332 can form part of, or be integrated into, the audio system 319 in order to enable user interaction with the audio system 319. Further, audio signals produced by or received at the vehicle audio system 319 may be provided to the audio speakers 326 for output or playback thereof. In such cases, the display 328 may display media information (e.g., radio station number and/or name, track name, track number, artist name, time remaining, time elapsed, etc.) and/or current setting information (e.g., volume level, equalization level(s), fade and balance levels, media mode (e.g., AM/FM radio, CD, Line-In, etc.), etc.) of the audio system 319. And the input devices 332 may include switches, knobs, dials (e.g., radio tuner dials, volume dial, etc.), and/or buttons (e.g., power button, play button, fast-forward button, reverse, backward, or rewind button, search button, stop button, skip button, etc.) for controlling the audio system 319.

Figure 4:
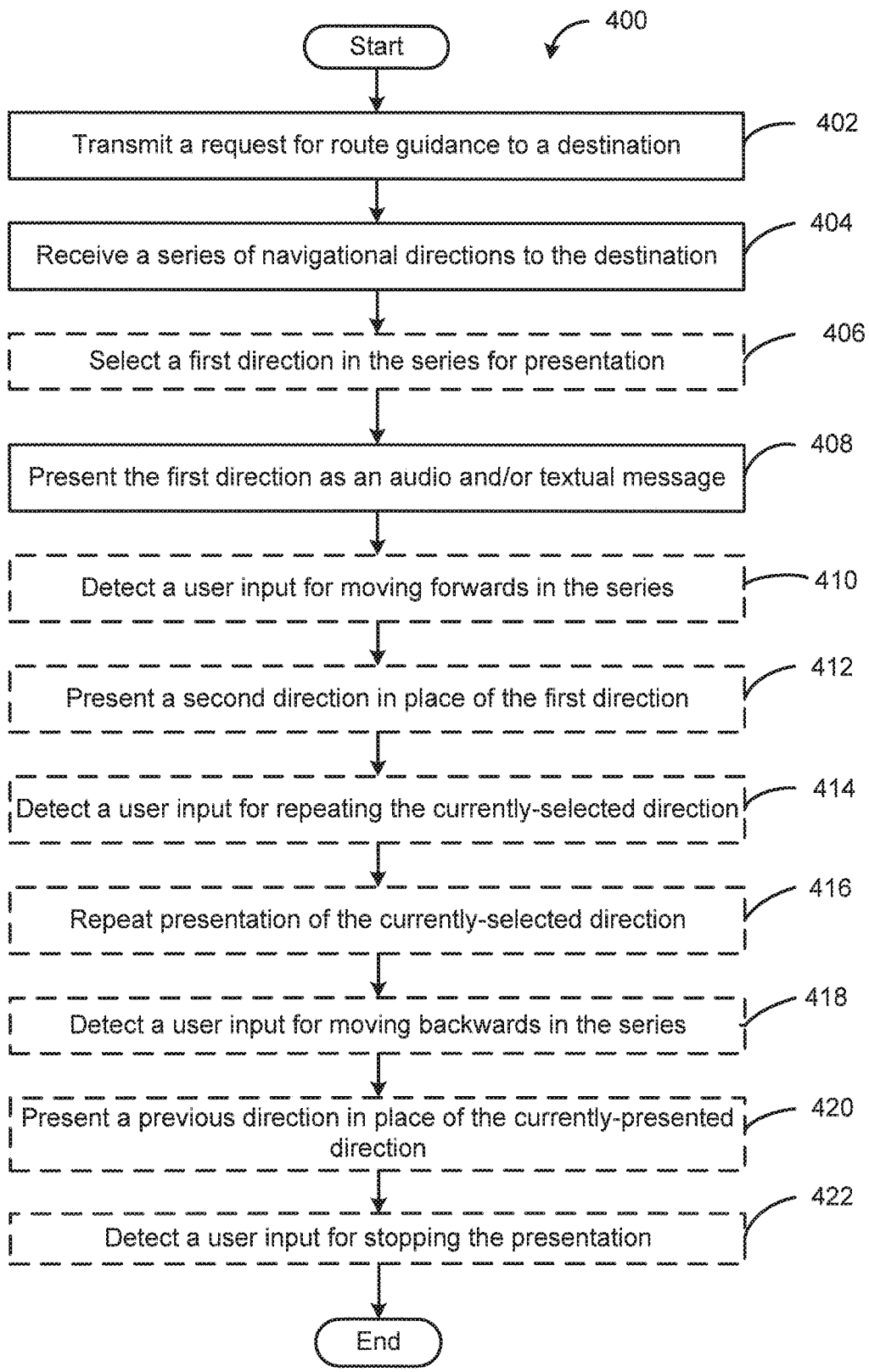
FIG. 4 is a flow diagram of an example method for providing pseudo-navigation assistance in a vehicle, in accordance with certain embodiments.

FIG. 4 illustrates an example method 400 for providing pseudo-navigation assistance in a vehicle, in accordance with embodiments. The method 400 can be carried out by a non-navigation-capable vehicle, such as the vehicle 10 in FIG. 2. Further, the non-navigation-capable vehicle can interact with one or more components of the wireless communication system 200 or the environment 100, such as the vehicle 20, to carry out the operations of the method 400. In one embodiment, the method 400 is implemented, at least in part, by the data processor 302 executing software stored in the data storage device 304, such as the pseudo-navigation module 210.

The method 400 can begin at step 402, where a request for route guidance to an indicated destination is transmitted by a wireless transceiver (e.g., the DSRC transceiver 212) of a first, non-navigation-capable vehicle (e.g., the vehicle 10) to one or more vehicles (e.g., the vehicles 20, 30, and 40) within a broadcast range (e.g., 100 to 1000 meters) of the wireless transceiver. The request for route guidance may be received by a wireless transceiver (e.g., the wireless transceiver 208) of one or more neighboring vehicles. In some embodiments, the request may be transmitted directly to one or more specific vehicles (e.g., the vehicle 20) using point-to-point communications. In other embodiments, the request may be broadcast to all vehicles within the broadcast range of the wireless transceiver.

Prior to sending the request, a vehicle operator may enter destination information and/or indicate a need for route guidance using one or more vehicle input devices (e.g., the input devices 332). The user-entered information may be provided to a processor (e.g., the data processor 302) of the vehicle, and processor and/or the pseudo-navigation module 210 may generate the request for route guidance based on the user-entered information and in accordance with any wireless message protocols associated with the wireless transceiver (e.g., DSRC message protocols). In embodiments, the request for route guidance includes at least the destination information provided by the vehicle operator, such as, for example, a street address, a listing of cross streets, a point of interest, or a business or building name.

At step 404, the non-navigation-capable vehicle receives a series of navigational directions (e.g., the navigational directions 324) to the indicated destination from a second, navigation-capable vehicle (e.g., the vehicle 20) in response to the request for route guidance. The series of navigational directions can include step-by-step, static commands to guide an operator of the first vehicle from a starting location to the destination included in the request. Each navigational direction can include one or more of maneuvers to be performed (e.g., turn, merge, stay, etc.), street names or other roadside descriptors to indicate where or when to perform the maneuvers, and driving distances or times associated with performing the maneuvers. The starting location may be determined by the second vehicle, for example, using a location-determining receiver (e.g., the GPS receiver 205) and/or a vehicle navigation system (e.g., the navigation unit 203) included in the vehicle 20. In some cases, the starting location is a location of the second vehicle at the time of receiving or fulfilling the request. In other cases, the starting location is an estimated location of the first vehicle at the time of submitting the request, as determined by the second vehicle, or more specifically, the navigation system included therein. In embodiments, the series of navigational directions can be transmitted by the wireless transceiver of the second vehicle, received at the wireless transceiver of the first vehicle, and then provided to the pseudo-navigation module 210 and/or the data processor 302 for processing.

At step 406, a first direction in the series of navigational directions is selected for presentation, and at step 408, the first direction is presented as at least one of an audio (or audible) message and a textual (or written) message via a user interface or human-machine interface (HMI) (e.g., the user interface 216) of the first vehicle. For example, where the navigational directions are presented as textual messages, the pseudo-navigation module can generate a string of text representing each navigational direction and provide the text to a display screen (e.g., the display 328) of the non-navigation-capable vehicle for display thereon. As another example, where the navigational directions are presented as audio messages, the pseudo-navigation module can generate an audio file representative of each navigational direction and provide the file to one or more audio speakers (e.g., the audio speakers 326) of the vehicle for playback there-through.

In embodiments, each navigational direction in the series is individually presented one at a time, and the user can toggle through the series of directions using one or more input devices (e.g., the input devices 332) included in the user interface. In such cases, a characteristic (e.g., type, source, etc.) of the user input determines whether the navigational direction presented after the first direction is the direction immediately following the first direction in the series of navigational directions, the direction immediately preceding the first direction in the series, or a repeat of the first direction.

For example, according to some embodiments, the method 400 further includes step 410, where a user input for moving forward in the series of directions is detected via the user interface. The user input may be selection of a fast-forward button, next button search button, play button, or any other button, dial, or input device of the audio system that is configured for causing the user interface to present a next direction in the series of navigational directions. In response to the detection at step 410, at step 412 the user interface presents a second or next direction in the series in place of the first direction. For example, if the navigational directions are being presented as textual messages displayed on the display screen, the user interface may stop displaying the first direction and begin displaying the second direction. As another example, if the navigational directions are being played as audio messages via the audio speakers, the user interface may stop playing the first direction and begin playback of the second direction. In some cases, the vehicle operator may select the next direction in order to preview an upcoming navigational direction. In some cases, the method 400 may automatically continue from step 408 to step 412 and skip step 410, for example, if the pseudo-navigation module 210 is configured to automatically present the series of navigational directions in a sequential loop with pre-defined gaps of time between each adjacent pair of directions. In some cases, the method 400 may continue from step 408 directly to step 412 if a user input has not been detected within a preset amount of time.

As another example, in some embodiments, the method 400 further includes step 414, where a user input for repeating a currently-selected direction is detected by the user interface. The user input may be selection of a play button, repeat button, or other input device of the audio system that is configured for causing the user interface to repeat a currently-selected direction. In response to the detection at step 414, at step 416 the user interface repeats presentation of the currently-selected direction, by, for example, re-playing the audio message or re-displaying the text message, depending on the selected presentation format.

For example, the vehicle operator may request a repeat of the currently-selected direction if he/she missed a turn, or did not properly see or hear the direction during the initial presentation. In some cases, step 416 may be automatically performed after either step 408 or step 412, for example, if the pseudo-navigation module 210 is configured to repeat presentation of the currently-selection direction until a new user input is received or if a user input is not detected within a preset amount of time.

As yet another example, in some embodiments, the method 400 also includes step 418, wherein a user input for moving backwards in the series of navigational directions is detected via the user interface. The user input may be selection of a back button, a rewind button, or any other input device of the audio system that is configured for causing the user interface to present a previous or immediately preceding direction in the series of navigational directions. In response to the detection at step 418, at step 420 the method 400 includes presenting a previous direction in place of the currently-presented direction via the user interface. For example, if the currently-presented direction is the second direction presented at step 412, then at step 420, the first direction is presented in place of the second direction by re-playing the audio message for the first direction or re-displaying the textual message for the first direction, depending on the selected presentation format.

In some embodiments, the method 400 also includes at step 422, detecting a user input for stopping the presentation of the navigational directions via the user interface. For example, the user input may be selection of a stop button or any other input device of the audio system that is configured for causing the user interface to stop presentation of the navigational directions. The method 400 may end after step 422 if no other user inputs are received (e.g., to restart the presentation). In some cases, the method 400 may automatically stop (e.g., without waiting for step 422) upon completion of one cycle of the series of navigational directions, for example, where the pseudo-navigation module 210 is not configured to repeat presentation of the navigational directions in an endless loop.

It will be appreciated that the series of navigational directions may include any number of navigational directions, as required to convey route guidance to the indicated destination. In some cases, the navigational directions are presented as both audio messages and textual messages, for example, to make sure the vehicle operator has ample opportunity to receive and understand the directions. If the navigational directions are presented on a display, the display may be configured to scroll the textual message across the display, for example, if the textual message is longer than a width of the display. In some cases, the user inputs for toggling between the navigational directions can be received as voice commands through a voice or speech recognition system of the first vehicle (e.g., the voice recognition module 330), where the voice commands include "next," "back," "repeat," or the like.

Figure 5:
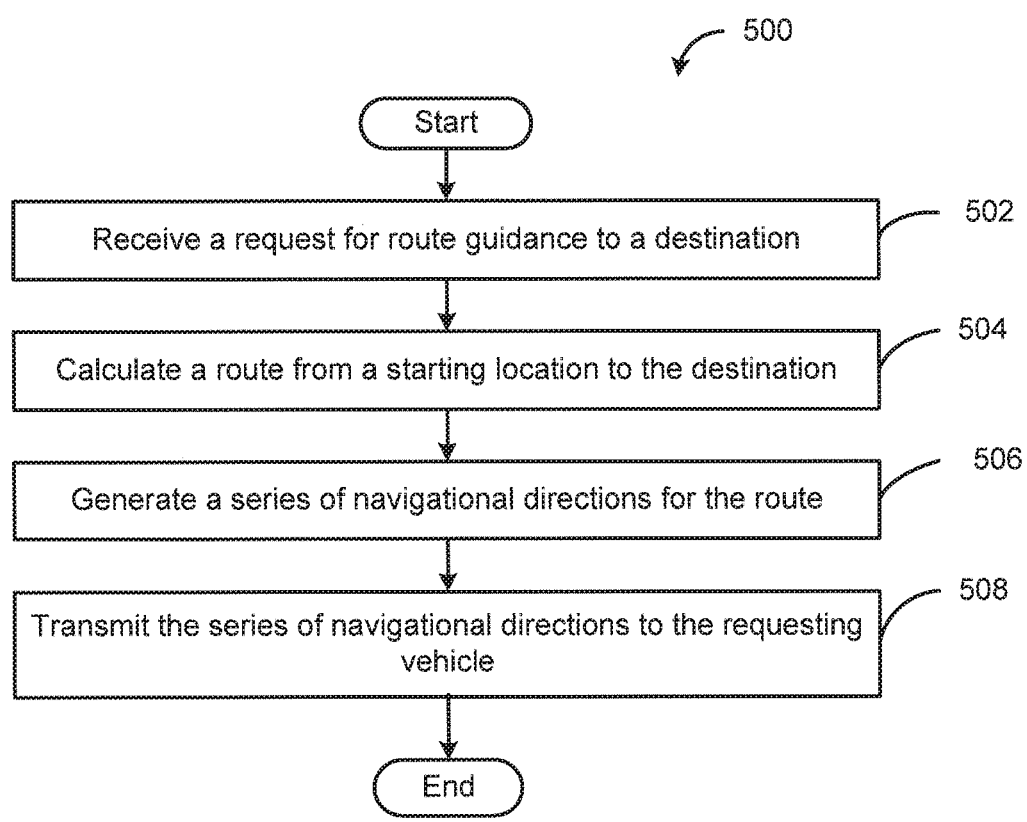
FIG. 5 is a flow diagram of an example method for providing pseudo-navigation assistance to another vehicle, in accordance with certain embodiments.

FIG. 5 illustrates an example method 500 for providing pseudo-navigation assistance to another vehicle, in accordance with embodiments. The method 500 can be carried out by a navigation-capable vehicle, such as the vehicle 20 in FIG. 2. Further the navigation-capable vehicle can interact with one or more components of the wireless communication system 200 or the environment 100, such as the vehicle 10, in order to carry out the operation of the method 500. In one embodiment, the method 500 is implemented, at least in part by a data processor executing software stored in a memory of the navigation-capable vehicle and/or associated with a navigation system of the same (e.g., the navigation unit 203).

The method 500 can begin at step 502, where a request for route guidance to an indicated destination is received from a first, non-navigation-capable vehicle (e.g., the vehicle 10) via a wireless transceiver (e.g., the DSRC transceiver 208) of a second, navigation-capable vehicle (e.g., the vehicle 20). The first vehicle may be within a reception range of the wireless transceiver of the second vehicle, and the request for route guidance may be transmitted by a wireless transceiver (e.g., the DSRC transceiver 212) of the first vehicle. Upon receiving the request, a telematics control unit (e.g., the TCU 206) of the second vehicle may provide the request to a navigation system (e.g., the navigation unit 203) of the second vehicle. At step 504, the navigation system calculates a route from a starting location to the destination included in the request. The starting location may be determined by a location-determining receiver (e.g., the GPS receiver 205) of the second vehicle and/or the navigation system and may include, for example, the location of the second vehicle at the time of receiving or fulfilling the request, or the estimated location of the first vehicle at the time of sending the request.

At step 506, the navigation system generates a series of navigational directions for the route calculated at step 504. The navigational directions can include step-by-step, static commands for traveling from the starting location to the destination included in the request. Each navigational direction can include one or more of maneuvers to be performed (e.g., turn, merge, stay, etc.), street names or other roadside descriptors to indicate where or when to perform the maneuvers, and driving distances or times associated with performing the maneuvers. The navigation system may generate the series of directions according to wireless protocol requirements for the wireless network being used to communicate with the first vehicle (e.g., DSRC message protocols). At step 508, the second vehicle transmits the series of navigational directions to the first vehicle using the telematics control unit, or via the wireless transceiver of, the second vehicle.

Thus, the systems and methods described herein can provide pseudo-navigation assistance to a non-navigation-capable vehicle using wireless communication (e.g., via DSRC technology) between the non-navigation-capable vehicle and a nearby navigation-capable vehicle. The navigation-capable vehicle provides the pseudo-navigation assistance as a series of static, step-by-step, navigational directions in response to a request for route guidance submitted by the non-navigation-capable vehicle. The directions are provided to the operator of the non-navigation-capable vehicle in the form of audio and/or text messages and are presented one-by-one via an existing user interface of the vehicle (e.g., the vehicle cluster, the audio system's display screen, or the vehicle audio speakers).

In certain embodiments, the process descriptions or blocks in the figures, such as FIGS. 4 and 5, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle, comprising:
  a wireless transceiver for communicating with a second vehicle;
  a processor configured to:
    send a request to the second vehicle for route guidance to a destination, the request including the destination; and
    receive a series of static commands from the second vehicle for navigating from a starting location to the destination, wherein the series of static commands are indicative of a route calculated by the second vehicle using the request, the route navigating the vehicle from the starting location to the destination; and
  a user interface for presenting each of the static commands one at a time as at least one of audio messages and textual messages.

2. The vehicle of claim 1, wherein the series of the static commands includes one or more of driving maneuvers and driving distances.

3. The vehicle of claim 1, wherein the user interface includes one or more input devices for enabling a user to selectively control presentation of the series of the static commands received from the second vehicle.

4. The vehicle of claim 3, wherein the one or more input devices are configured to enable forward and backward movement through the series of the static commands received from the second vehicle.

5. The vehicle of claim 3, wherein the user interface is an audio system and the one or more input devices include a button or dial for controlling audio playback via the audio system.

6. The vehicle of claim 1, wherein the user interface includes at least one of a speaker for playing the audio messages and a display screen for displaying the textual messages.

7. The vehicle of claim 1, wherein the wireless transceiver is a dedicated short range communication transceiver.

8. A method for providing pseudo-navigation assistance in a vehicle, comprising:
  transmitting a request to a second vehicle for route guidance to a destination, the request including the destination;
  receiving a series of static commands from the second vehicle for navigating from a starting location to the destination, wherein the series of static commands are indicative of a route calculated by the second vehicle using the request, the route navigating the vehicle from the starting location to the destination; and
  presenting, via a user interface, each of the static commands one at a time as at least one of audio messages and textual messages.

9. The method of claim 8, wherein the series of the static commands includes one or more of driving maneuvers and driving distances.

10. The method of claim 8, further comprising:
  selecting a first command of the series of the static commands for presentation via the user interface; and
  upon receiving a user input, presenting, via the user interface, a second command of the series of the static commands in place of the first command.

11. The method of claim 10, wherein a characteristic of the user input determines whether the second command immediately follows the first command in the series of the static commands or immediately precedes a first direction in the series of the static commands.

12. The method of claim 8, wherein presenting includes at least one of displaying the textual messages on a display screen in the vehicle and playing the audio messages using a speaker in the vehicle.

13. The method of claim 8, wherein the vehicle wirelessly communicates with the second vehicle using dedicated short range communication technology.

14. A wireless communication system, comprising:
  a wireless unit of a first vehicle and configured to transmit a request to a second vehicle for route guidance to a destination, the request including the destination; and
  a telematics unit of the second vehicle and configured to transmit a series of static commands to the first vehicle for navigating from a starting location to the destination, wherein the series of static commands are indicative of a route calculated by the second vehicle using the request, the route navigating the first vehicle from the starting location to the destination,
  the series of the static commands including one or more of driving maneuvers and driving distances.

15. The wireless communication system of claim 14, wherein each of the static commands is presented one at a time as at least one of audio messages and text messages via a user interface of the first vehicle.

16. The wireless communication system of claim 14, wherein the second vehicle is moving in the same direction as the first vehicle.

17. The wireless communication system of claim 14, wherein the second vehicle is located within a predetermined proximity of the first vehicle.

18. The wireless communication system of claim 14, wherein the series of the static commands is generated by a navigation unit included in the second vehicle.

19. The wireless communication system of claim 14, wherein the wireless unit communicates with the telematics unit using dedicated short range communication technology.

* * * * *